(12) United States Patent
Komaba et al.

(10) Patent No.: US 11,167,740 B2
(45) Date of Patent: Nov. 9, 2021

(54) COIL ASSEMBLY AND BRAKE CONTROL DEVICE

(71) Applicants: Veoneer Nissin Brake Systems Japan CO., LTD., Yokohama (JP); NISSIN KOGYO CO., LTD., Tomi (JP)

(72) Inventors: Takaaki Komaba, Yokohama (JP); Kyosuke Ishiai, Yokohama (JP); Kentaro Chiba, Tomi (JP)

(73) Assignees: Veoneer Nissin Brake Systems Japan Co., Ltd., Kanagawa (JP); Nissin Kogyo Co., Ltd., Nagano (JP)

(*) Notice: Subject to any disclaimer, the term of this patent is extended or adjusted under 35 U.S.C. 154(b) by 0 days.

(21) Appl. No.: 16/486,648

(22) PCT Filed: Feb. 16, 2018

(86) PCT No.: PCT/JP2018/005537
§ 371 (c)(1),
(2) Date: Aug. 16, 2019

(87) PCT Pub. No.: WO2018/151263
PCT Pub. Date: Aug. 23, 2018

(65) Prior Publication Data
US 2020/0055507 A1 Feb. 20, 2020

(30) Foreign Application Priority Data
Feb. 17, 2017 (JP) .............................. JP2017-028522

(51) Int. Cl.
*B60T 15/02* (2006.01)
*F16K 31/06* (2006.01)
(Continued)

(52) U.S. Cl.
CPC ............ *B60T 15/028* (2013.01); *F16K 31/06* (2013.01); *H01F 7/081* (2013.01); *H01F 27/325* (2013.01)

(58) Field of Classification Search
CPC ..... B60T 15/028; H01F 5/04; H01F 2007/083
See application file for complete search history.

(56) References Cited

U.S. PATENT DOCUMENTS 2,889,497 A * 6/1959 Wolf .................... H01F 5/04
335/299
2007/0051839 A1 3/2007 Tsujimura et al.

FOREIGN PATENT DOCUMENTS

EP 1235234 A1 8/2002
EP 2703241 B1 * 7/2016 ............ B60T 8/3675
(Continued)

OTHER PUBLICATIONS

English Machine Translation of EP2703241B1; retrieved from espacenet.com (Year: 2012).*
(Continued)

*Primary Examiner* — Reinaldo Sanchez-Medina
*Assistant Examiner* — Nicole Gardner
(74) *Attorney, Agent, or Firm* — Carrier Blackman & Associates, P.C.; Joseph P. Carrier; Jeffrey T. Gedeon

(57) ABSTRACT

A coil assembly includes: a bobbin; a coil including a winding around the bobbin; a yoke attached to the bobbin; and a connection terminal electrically connected to the winding. The connection terminal is a press-fit terminal that includes a terminal portion projecting perpendicularly from the bobbin outward in an axial direction of the bobbin. The yoke is arranged on a side of the bobbin that is opposite to the terminal portion in an axial direction of the terminal portion, and supports the press-fit terminal.

8 Claims, 9 Drawing Sheets

(51) Int. Cl.
*H01F 7/08* (2006.01)
*H01F 27/32* (2006.01)

(56) References Cited

FOREIGN PATENT DOCUMENTS

| JP | H03-171704 A | 7/1991 |
| JP | 2007-092988 A | 4/2007 |
| JP | 2009-113701 A | 5/2009 |
| JP | 2010-234826 A | 10/2010 |
| WO | 00/70628 A1 | 11/2000 |

OTHER PUBLICATIONS

English Machine Translation of JP2010234826A; retrieved from espacenet.com (Year: 2010).*
English Machine Translation of JP2007092988A; retrieved from espacenet.com (Year: 2007).*
PCT/ISA/210 from International Application PCT/JP2018/005537 with the English translation thereof.
Written Opinion ( PCT/ISA/237) from International Application PCT/JP2018/005537.
Extended European search report dated Jun. 18, 2020 issued in the corresponding EP Patent Application No. 18754030.7.

* cited by examiner

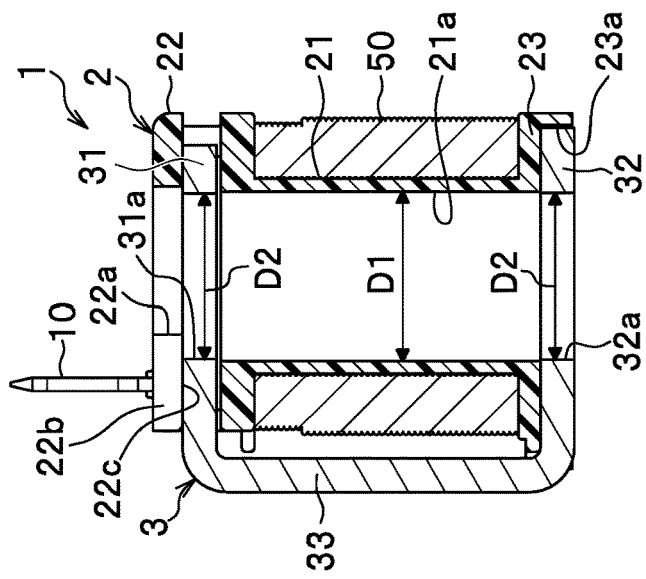
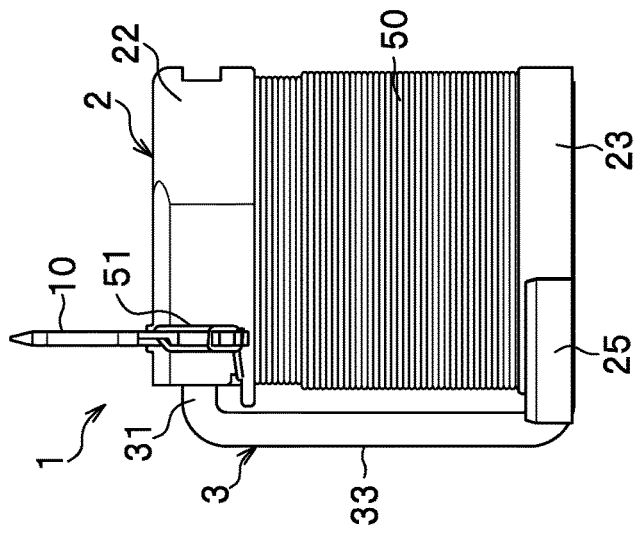
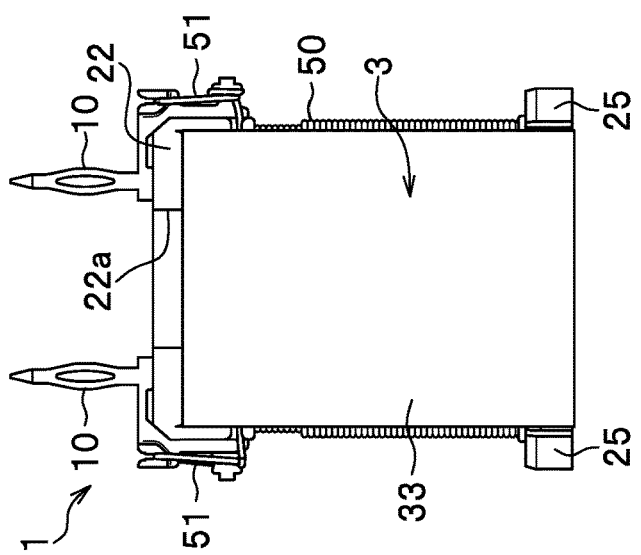

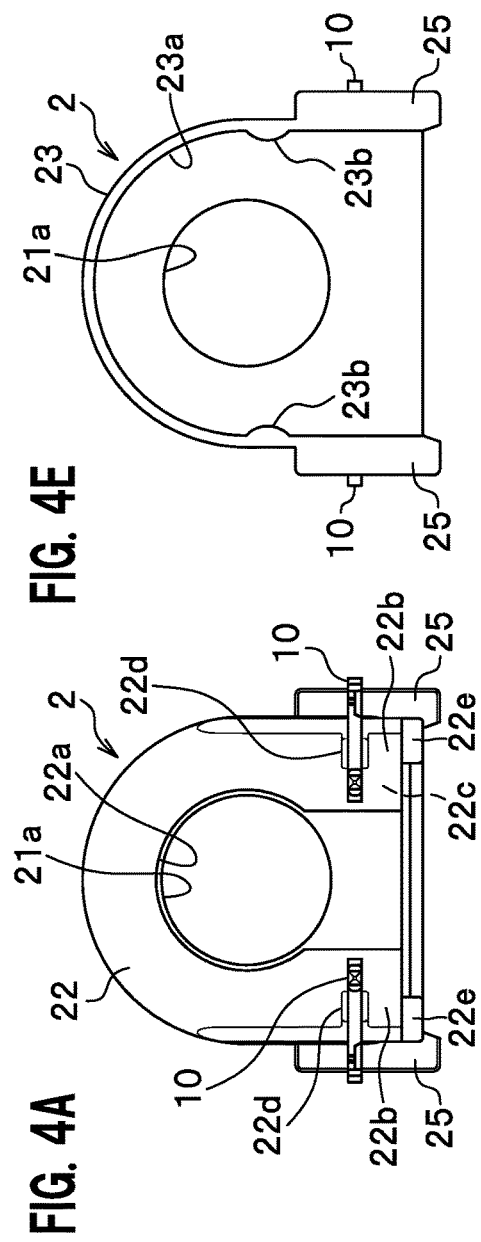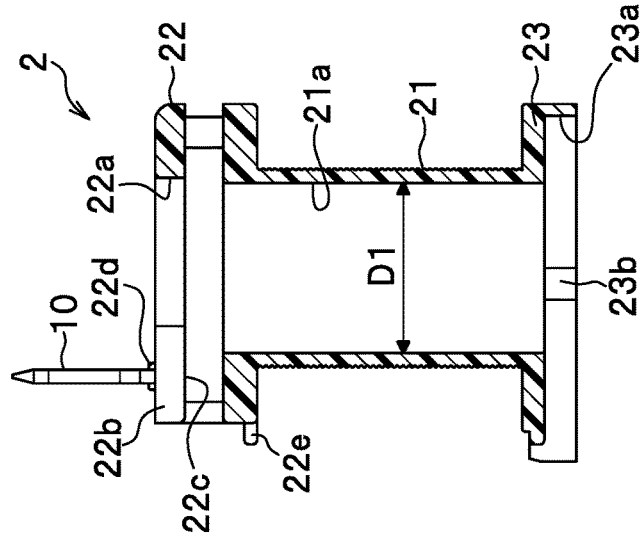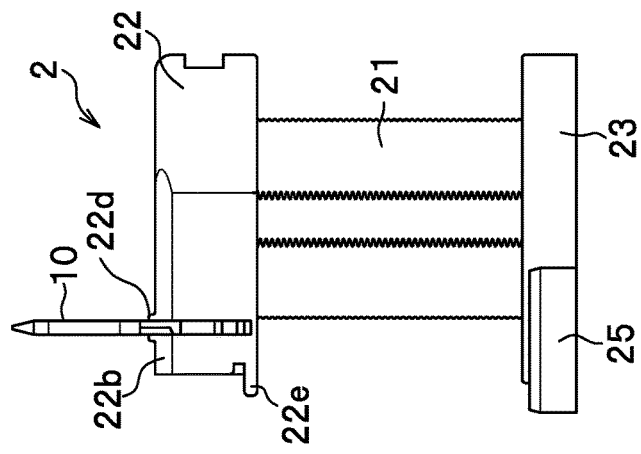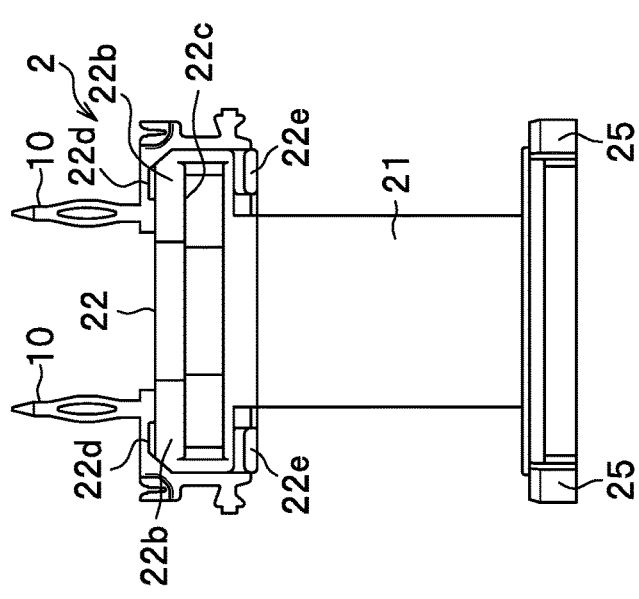

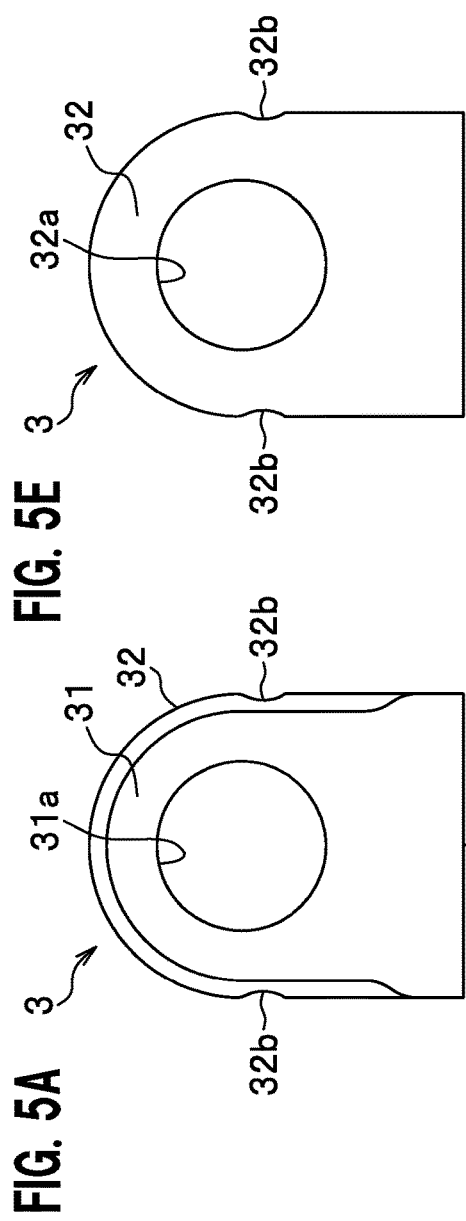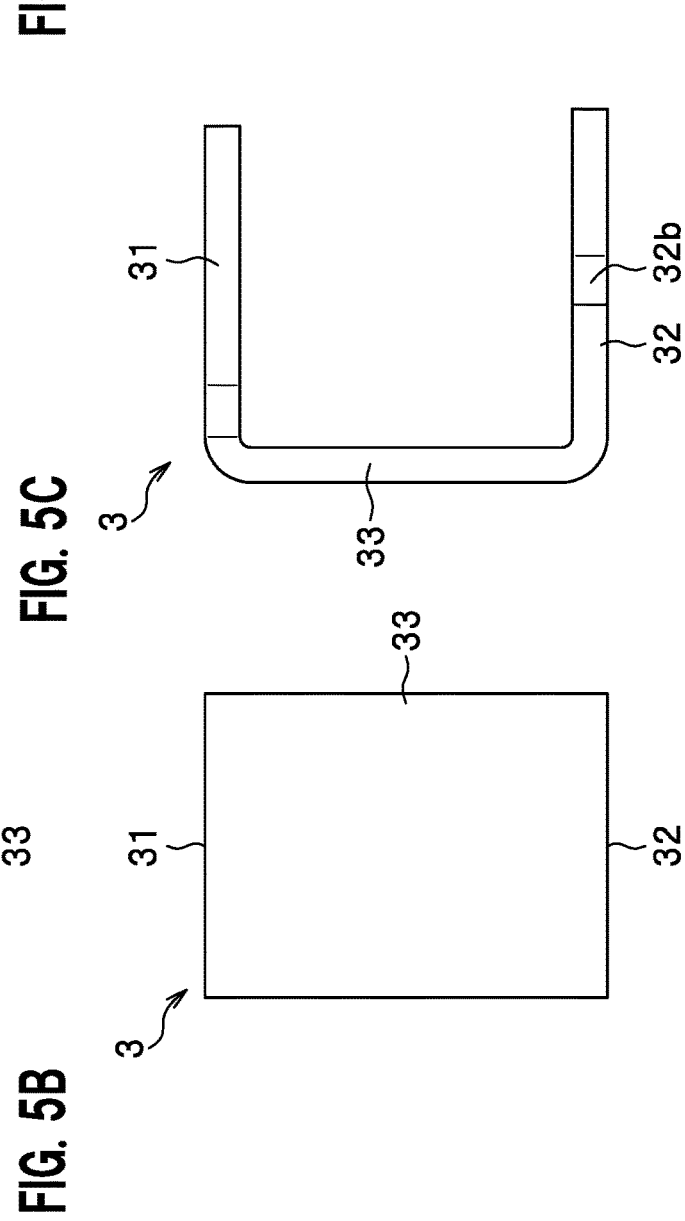

COIL ASSEMBLY AND BRAKE CONTROL DEVICE

TECHNICAL FIELD

The present invention relates to a coil assembly and a brake control device.

BACKGROUND ART

Conventionally, brake systems for vehicles such as two-wheel vehicles and four-wheel vehicles have been known to include a brake control device that controls the brake hydraulic pressure acting on a wheel brake. The brake control device includes a base body with brake fluid paths formed therein, solenoid valves attached to one surface of the base body, coil assemblies each surrounding the solenoid valves, a housing that covers the solenoid valves and the coil assemblies, and a control board functioning as an electrical component installed in the housing.

In such a brake control device, the control board controls the energization to the coil assemblies to open and close the solenoid valves, and thereby changes the brake hydraulic pressure in the brake fluid paths to control the braking force applied to the wheel brake.

The coil assembly includes a yoke, a bobbin disposed in the yoke, and a coil wound around the bobbin.

As for connection terminals connected to the coil, press-fit terminals have been known as described in Patent Literature 1, for example. The press-fit terminals are press-mounted into mounting holes of the control board, thereby electrically connecting the coil assembly to the control board. Further, the coil assembly is attached around the solenoid valve in such a way that the solenoid valve is inserted through a center hole of the bobbin, and the coil is energized from the control board, thereby opening and closing the solenoid valve.

CITATION LIST

Patent Literature

Patent Literature 1: Japanese Patent Application Publication No. 2010-234826

SUMMARY OF INVENTION

Technical Problem

In the above-mentioned conventional coil assembly, each press-fit terminal has a plurality of bent portions and extends toward the control board. When the press-fit terminal is press-fitted into the mounting hole formed in the control board, a tool provided at an equipment side is placed on a lower side of the bent portions and is pressed in such a way that the press-fit terminals are pressed toward the control board side. Therefore, a space for placing the tool needs to be formed on a lateral side of the coil assembly.

The present invention provides a coil assembly and a brake control device that solve the above-mentioned problem, is capable of being assembled to an electrical component without using a tool for assembly, and is capable of enhancing the downsizing and the flexibility of layout by eliminating a space for placing the tool.

Solution to Problem

To solve the above problems, the present invention provides a coil assembly including: a bobbin; a coil including a winding around the bobbin; a yoke attached to the bobbin; and a connection terminal electrically connected to the winding. The connection terminal is a press-fit terminal that includes a terminal portion projecting perpendicularly from the bobbin outward in an axial direction of the bobbin. The yoke is arranged on a side of the bobbin that is opposite to the terminal portion in an axial direction of the terminal portion, and supports the press-fit terminal.

According to the structure of the coil assembly in the present invention, the press-fit terminal is supported by the yoke located on a side of the bobbin that is opposite to the terminal portion in the axial direction of the terminal portion. Thus, the yoke can receive a load applied in the axial direction when the terminal portion is press-fitted into the mounting hole of the control board. This enables the coil assembly to be electrically connected to the control board without using a tool for assembly or the like. Therefore, it is possible to eliminate a tool space that has been necessary for the connection operation and to enhance the downsizing and the flexibility of layout accordingly.

The yoke of the above-mentioned coil assembly may be configured to support the press-fit terminal via an insulator, so that it is possible to suitably insulate the yoke from the press-fit terminal.

The bobbin of the above-mentioned coil assembly may preferably include a resin portion formed of a resin and serving as the insulator. According to this structure, the yoke supports the press-fit terminal via the resin portion of the bobbin, so that it is possible to suitably insulate the yoke from the press-fit terminal.

The resin portion of the above-mentioned coil assembly may preferably cover a portion of the yoke that supports the press-fit terminal. With this configuration, it is possible to suitably insulate the yoke from the press-fit terminal.

Another aspect of the present invention is a brake control device that includes the above-mentioned coil assembly and further includes: a base body in which a fluid path is formed; a solenoid valve which is attached to one surface of the base body and on which the coil assembly is mounted; a housing fixed to the one surface of the base body, the housing covering the solenoid valve and the coil assembly; and a control board housed in the housing, the control board controlling an operation of the solenoid valve. The terminal portion is press-fitted into a mounting hole formed in the control board.

According to the structure of the brake control device of the present invention, when fixing the housing to the one surface of the base body, it is possible to press-fit the press-fit terminals by sandwiching the coil assembly with the base body and the control board in the axial direction of the bobbin. In other words, the press-fit terminal is supported by the yoke located on a side of the bobbin that is opposite to the terminal portion in the axial direction of the terminal portion. Moreover, the yoke is supported by the base body located spaced apart from the terminal portion in the axial direction thereof than the side of the bobbin. This enables the base body to receive the load applied when the terminal portion of the press-fit terminal is press-fitted into the mounting hole of the control board. This enables the coil assembly to be electrically connected to the control board without using a tool for assembly or the like. Therefore, the brake control device having an excellent assembling property can be obtained.

Advantageous Effects of Invention

The coil assembly and the brake control device of the present invention can be assembled to an electrical component without using a tool for assembly. Further, with the structure of the coil assembly and the brake control device of the present invention, it is possible to eliminate a space for disposing a tool and enhance the downsizing and the flexibility of layout.

BRIEF DESCRIPTION OF DRAWINGS

FIGS. 2A and 2B are views illustrating the coil assembly of the embodiment, wherein: FIG. 2A is a perspective view of the coil assembly seen from a side thereof on which a yoke is disposed; and FIG. 2B is an enlarged perspective view illustrating a press-fit terminal portion.

FIGS. 3A to 3E are views illustrating the coil assembly of the embodiment, wherein: FIG. 3A is a plan view; FIG. 3B is a rear view; FIG. 3C is a right-side view; FIG. 3D is a vertical cross-sectional view; and FIG. 3E is a bottom view.

FIGS. 4A to 4E are views illustrating a bobbin that is a constituent element of the coil assembly of the embodiment, wherein: FIG. 4A is a plan view; FIG. 4B is a rear view; FIG. 4C is a right-side view; FIG. 4D is a vertical cross-sectional view; and FIG. 4E is a bottom view.

FIGS. 5A to 5E are views illustrating a yoke that is a constituent element of the coil assembly of the embodiment, wherein: FIG. 5A is a plan view; FIG. 5B is a rear view; FIG. 5C is a right-side view; FIG. 5D is a vertical cross-sectional view; and FIG. 5E is a bottom view.

FIGS. 6A to 6D are views illustrating a press-fit terminal that is a constituent element of the coil assembly of the embodiment, wherein: FIG. 6A is a front surface view; FIG. 6B is a left side view; FIG. 6C is a rear view; and FIG. 6D is an enlarged rear view of substantial parts.

FIGS. 8A and 8B are views illustrating an assembly procedure of the coil assembly of the embodiment, wherein: FIG. 8A is a perspective view of the bobbin; and FIG. 8B is a perspective view illustrating how a yoke is assembled to the bobbin around which the coil is wound.

DESCRIPTION OF EMBODIMENT

Figure 2A:
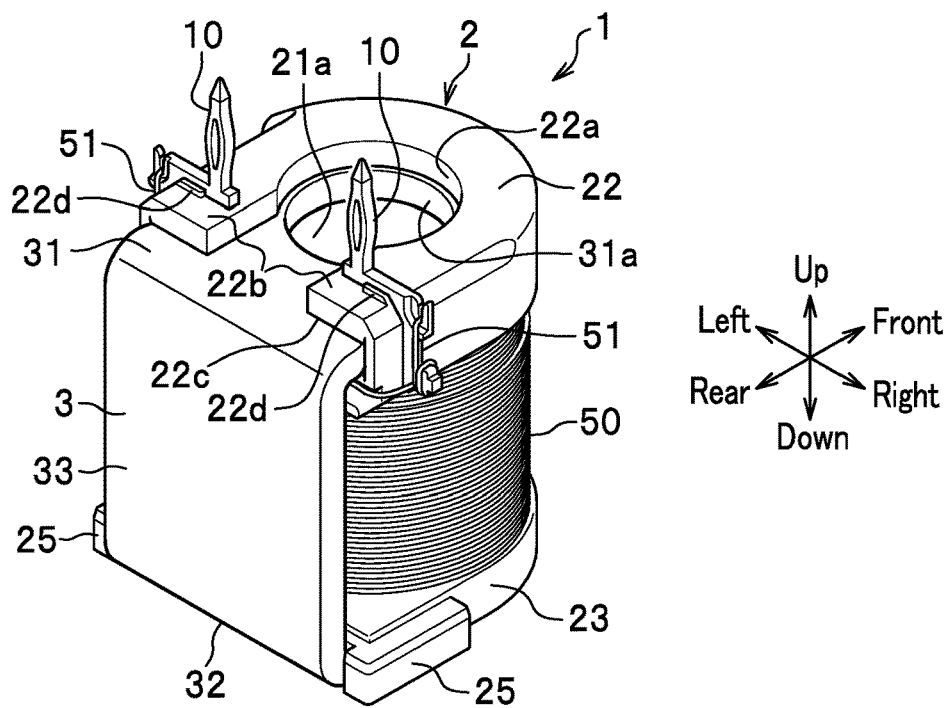

Hereinafter, an embodiment of the present invention will be described in detail with reference to the accompanying drawings as appropriate. In the following description, when front, rear, left, right, upper, and lower sides of a coil assembly are referred to, directions illustrated in FIG. 2A are used as references. It should be noted that the description is not intended to limit the direction in which the coil assembly is assembled into a brake control device. The embodiment is described with exemplifying a case where the coil assembly in the present invention is applied to the brake control device.

Figure 1:
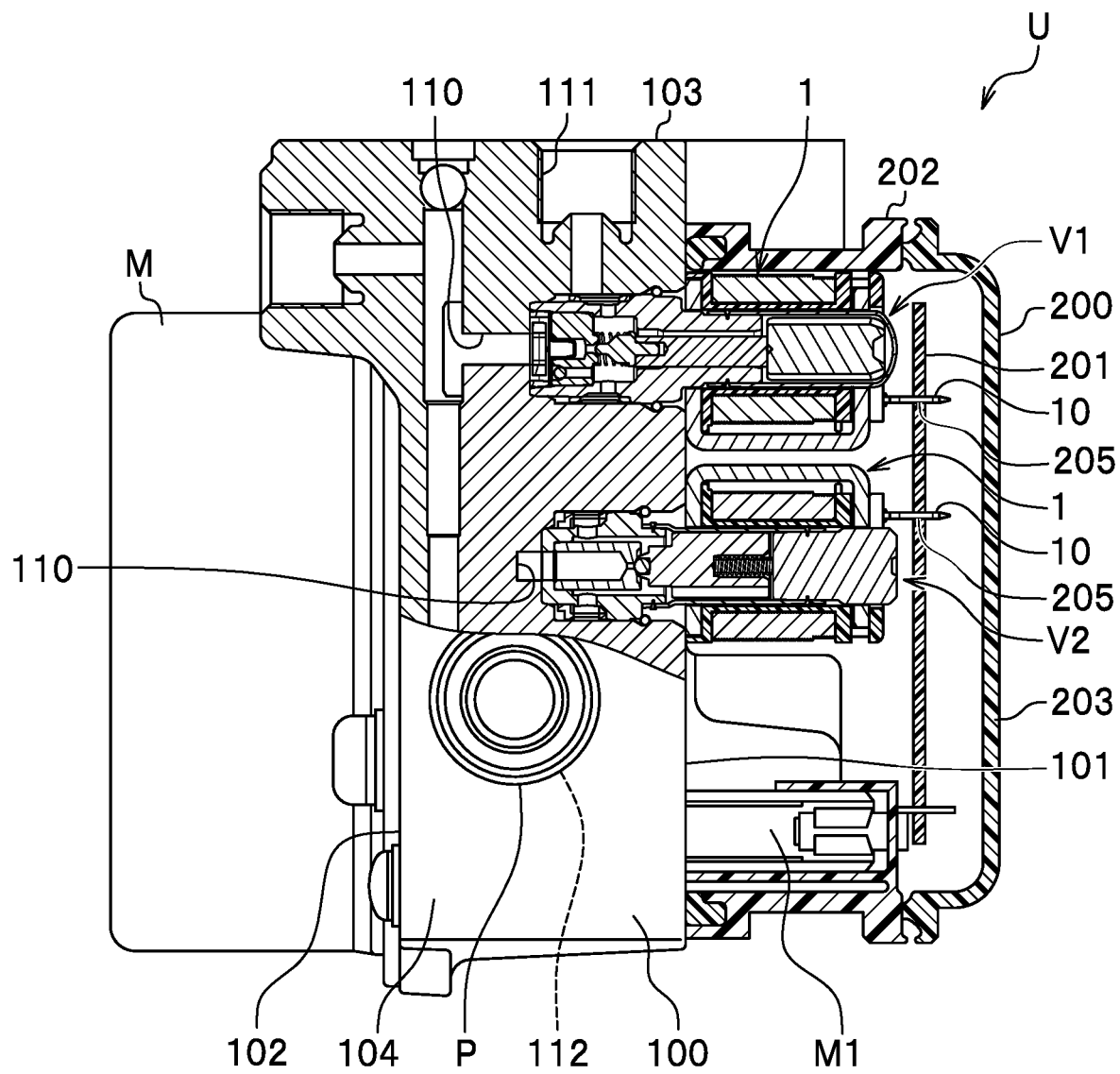
FIG. 1 is aside cross-sectional view illustrating a brake control device that includes a coil assembly according to an embodiment.

Firstly, the brake control device will be described.
[Configuration of Brake Control Device]
A brake control device U includes a base body 100 to which a pressure sensor, solenoid valves V1 and V2, a motor M, a reciprocation pump P, and the like are assembled, as illustrated in FIG. 1. Moreover, the brake control device U includes an electronic control unit 200 including a control board 201 serving as an electrical component that detects the motion of a vehicle body, controls opening and closing of the solenoid valves V1 and V2, and controls operations of the motor M.

A not-shown brake fluid path (oil path) is formed in the base body 100. The brake control device U is configured such that the control board 201 causes the solenoid valves V1 and V2 and the motor M to operate on the basis of the motion of the vehicle body, thereby causing the brake hydraulic pressure in the brake fluid path to change.

(Configuration of Base Body)

The base body 100 is a metal component formed in a substantially rectangular parallelepiped, and the brake fluid path (oil path) is formed therein.

Of the surfaces of the base body 100, a surface 101 on a front side, referred to as one surface, has a plurality of bottomed attaching holes 110 and the like formed therein in which the solenoid valves V1 and V2 and a pressure sensor (not illustrated) are mounted. Note that, the number of the solenoid valves V1 and V2 and the pressure sensors to be used differs between cases where the vehicle is a four-wheel vehicle and cases where the vehicle is a two-wheel vehicle, and the number differs depending on the difference in the function of the brake control device, for example. Coil assemblies 1 are respectively mounted on the solenoid valves V1 and V2 of the embodiment. The solenoid valve V1 is, for example, a normally open solenoid valve. The solenoid valve V2 is, for example, a normally closed solenoid valve. The coil assemblies 1 are electrically connected to the control board 201 using press-fit terminals 10, respectively, as described later.

The base body 100 has an outlet port 111 or the like formed on a side of an upper surface 103 of the base body 100, to which outlet port 111 a piping leading to a wheel brake (not illustrated) is connected.

Moreover, base body 100 has a reservoir hole or the like formed on a side of a lower surface of the base body 100, to which reservoir hole a reservoir component (not illustrated) constituting a reservoir is assembled.

Moreover, base body 100 has a pump hole 112 or the like formed on a side of a side surface 104 of the base body 100, to which pump hole 112 the reciprocation pump P is attached.

Note that, the holes formed in the base body 100 are communicated with one another directly or via a not-illustrated brake fluid path formed in the base body 100.

(Configuration of Motor)

The motor M is an electrical component serving as a driving power source of the reciprocation pump P. The motor M is integrally fixed to a surface 102 on a rear side of the base body 100, referred to as other side of the base body 100. The motor M drives the reciprocation pump P.

A motor bus bar M1 for supplying electric power to a not-shown rotor is connected to the motor M. The motor bus bar M1 is inserted through a terminal hole (not shown) of the base body 100 and is electrically connected to the control board 201.

(Configuration of Electronic Control Unit)

As illustrated in FIG. 1, the electronic control unit 200 includes: the control board 201; a housing 202 that houses the control board 201, the solenoid valves V1 and V2 that protrude from the base body 100, the pressure sensor and the like; and a cover 203 that closes an opening of the housing 202.

The control board 201 is a substantially rectangular substrate main body on which an electric circuit is printed and to which electronic components such as semiconductor chip are attached. The control board 201 controls, by computer programs stored in advance, energization of the coil assembly 1 (see FIG. 2) and the motor M on the basis of information obtained from various kinds of sensors such as a pressure sensor, an angular velocity sensor and an acceleration sensor, which are not illustrated, in order to control opening and closing operations of the solenoid valves V1 and V2 and driving of the motor M.

As illustrated in FIG. 1, the housing 202 is a resin box body that is integrally fixed to the surface 101 on the front side of the base body 100 in such a way as to cover the solenoid valves V1 and V2 protruding from the surface 101 of the base body 100 on the front side thereof and the pressure sensor or the like.

The housing 202 is open-sided on the side opposite to the base body 100 and is open-sided on the side of the base body 100. The solenoid valves V1 and V2, the coil assembly 1, the pressure sensor, and the like are housed in an inner space of the housing 202.

The cover 203 is a lid which is made of a resin and which seals the opening of the housing 202 on the side thereof opposite to the base body 100. The cover 203 is fixed to an end face of the housing 202 by means of welding, bonding, screw-fastening, or the like.

[Configuration of Coil Assembly]

As illustrated in FIG. 2A and FIGS. 3A to 3E, the coil assembly 1 includes a bobbin 2, a coil 50 constituted by a winding 51 wound around the bobbin 2, a yoke 3 attached to the bobbin 2, and press-fit terminals 10 electrically connected to the winding 51 (coil 50) and serving as connection terminals. The coil assembly 1 is an electrical component to be housed in the housing 202 in a state of surrounding the solenoid valve V1 or V2 as shown in FIG. 1. The coil assemblies 1 are electromagnetic coils that respectively generate a magnetic field around the solenoid valves V1 and V2 by the respective coils 50 being energized from the control board 201 via the press-fit terminals 10.

(Configuration of Bobbin)

As illustrated in the views in FIGS. 4A to 4E, the bobbin 2 is a resin component (insulating component) with a cylindrical portion 21 having upper and lower end portions on which flange portions 22 and 23 are respectively formed. As illustrated in FIG. 4D, the cylindrical portion 21 has a circular insertion hole 21a centrally penetrating therethrough as a bobbin-side insertion hole. As illustrated in FIGS. 4A and 4D, the insertion hole 21a communicates with the later-described upper yoke housing portion 22c formed in the upper flange portion 22 and with a hole 22a of the flange portion 22. As illustrated in FIGS. 4D and 4E, the insertion hole 21a also communicates with a lower yoke housing portion 23a formed in the lower flange portion 23. The insertion hole 21a has an inside diameter D1.

As illustrated in FIGS. 4A and 4E, each of the flange portions 22 and 23 has a front portion that is formed in a semi-circular shape in plan view corresponding to the shape of the winding of the coil 50, and has a rear portion that is formed in a substantially rectangular shape in plan view corresponding to the shape of the yoke.

The hole 22a of the flange portion 22 has an inside diameter larger than the inside diameter D1 of the insertion hole 21a.

As illustrated in FIGS. 4B to 4D, the upper flange portion 22 is formed with a larger thickness in an up-and-down direction than the lower flange portion 23. As illustrated in FIG. 4D, formed on an inner side of the upper flange portion 22 is the upper yoke housing portion 22c, which can house the later-described upper portion 31 of the yoke 3. The upper yoke housing portion 22c has openings respectively on the rear surface and the front surface of the upper flange portion 22. The upper portion 31 of the yoke 3 is housed in the upper yoke housing portion 22c from the rear surface side of the upper flange portion 22 (see FIG. 8B).

The upper yoke housing portion 22c includes a predetermined clearance with respect to the housed upper portion 31 of the yoke 3 in a direction orthogonal to an axial direction of the bobbin 2 (in the horizontal direction). This allows the upper portion 31 of the yoke 3 to move in the horizontal direction by the clearance provided, in the upper yoke housing portion 22c.

Note that, the flange portion 22 covers the substantially entire upper portion 31 of the yoke 3, and thus has an excellent insulation property.

As illustrated in FIGS. 4A and 4B, the upper flange portion 22 has a rear edge portion on which two protrusions 22e, 22e are formed spaced apart from each other in the left-right direction with a predetermined distance therebetween. Each protrusion 22e is a plate-like portion that protrudes rearward from the rear edge portion of the upper flange portion 22 and is formed in a rectangular shape in plan view.

The upper flange portion 22 has left and right rear portions with terminal support portions 22b, 22b formed thereon that respectively support base portions 11, 11 of the two press-fit terminals 10, 10. The press-fit terminals 10, 10 are partially embedded in the terminal support portions 22b, 22b by insert-molding, respectively (see FIG. 2A). In other words, the terminal support portions 22b, 22b (upper flange portion 22) function as an insulator of the press-fit terminals 10, 10.

As illustrated in FIG. 3D, the upper portion 31 of the yoke 3, housed in the upper yoke housing portion 22c, is located below the terminal support portions 22b, 22b. In other words, the two press-fit terminals 10, 10 are supported by the upper portion 31 of the yoke 3 via the terminal support portions 22b, 22b. The terminal support portions 22b, 22b cover portions of the upper portion 31 of the yoke 3 that respectively support the press-fit terminals 10, 10. This provides insulation between the press-fit terminals 10, 10 and the yoke 3.

As illustrated in FIGS. 4B, 4D, and 4E, formed on an inner side of the lower flange portion 23 is the lower yoke housing portion 23a, which can house a lower portion 32 (see FIG. 3D) of the yoke 3. The lower yoke housing portion 23a has openings respectively on the rear surface and the lower surface of the lower flange portion 23. In other words, the lower portion 32 of the yoke 3 is exposed from the lower surface of the coil assembly 1 (see FIG. 3E). The lower portion 32 of the yoke 3 is housed in the lower yoke housing portion 23a from the rear surface side of the lower flange portion 23 (see FIG. 8B).

As illustrated in FIG. 4E, the lower yoke housing portion 23a has an inner face on which convex portions 23b, 23b having a curved shape and protruding inward are formed opposite to each other on left and right sides (see FIG. 4D). The lower yoke housing portion 23a includes, like the above-described upper yoke housing portion 22c, a predetermined clearance with respect to the housed lower portion 32 of the yoke 3 in a direction orthogonal to the axial direction of the bobbin 2 (in the horizontal direction). This allows the lower portion 32 of the yoke 3 to move in the horizontal direction by the clearance in the lower yoke housing portion 23a.

The lower flange portion 23 has quadrangular column-shaped protrusions 25, 25 formed on left and right-side surfaces of the lower flange portion 23 on a rear side thereof.

The protrusions 25, 25 each serve as a bonding surface for fixing to the base body 100 by an adhesive and serve as a positioning portion for assembling the coil assembly 1 to the brake control device U. Specifically, the protrusions 25, 25 can each be locked with a not-shown positioning member (rib, protrusion, or the like) provided on the front surface 101 (surface on which the solenoid valves V1 and V2 are mounted) of the base body 100, for example. By this locking, the coil assembly 1 mounted on the solenoid valve V1 or V2 is positioned so as to be unable to turn around an axis of the bobbin 2. Moreover, the protrusions 25, 25 can be locked with a not-shown wall portion provided on the inner side of the housing 202, for example. This wall portion is arranged around the coil assembly 1 and has grooves with which the protrusions 25, 25 are locked by press-insertion or the like.

The bobbin 2 described above is produced by injection-molding or the like. When the bobbin 2 is injection-molded, the press-fit terminals 10, 10 are insert-molded at the same time in such a way as to be integrally joined to the flange portion 22.

(Configuration of Yoke)

The yoke 3 is formed of a metal material having magnetic properties. As illustrated in the views in FIGS. 5A to 5E, the yoke 3 is configured to include the upper portion 31 as an end portion, the lower portion 32 as an end portion, and a side portion 33 that connects between the upper portion 31 and the lower portion 32. The yoke 3 is formed to have a vertical cross section with a substantially concave shape (see FIG. 5D).

The upper portion 31 is a part that is housed in the upper yoke housing portion 22c of the upper flange portion 22 of the bobbin 2 (see FIG. 3D). The upper portion 31 has an outer shape similar to that of the upper flange portion 22 of the bobbin 2, and has a front portion formed in a semi-circular shape and a rear portion formed in a substantially rectangular shape, as illustrated in FIG. 5A. The upper portion 31 is configured so as to be housed in the upper yoke housing portion 22c with the above-described clearance therebetween and is movable in the horizontal direction with respect to the upper yoke housing portion 22c.

Note that, the upper portion 31 is formed to have an outer shape that is slightly smaller than that of the lower portion 32, as illustrated in FIG. 5A.

The upper portion 31 is housed in the upper yoke housing portion 22c, and thus is arranged below the press-fit terminals 10 with the upper flange portion 22 in between. In other words, the press-fit terminals 10 (terminal portions 12 and base portions 11) are supported by the upper portion 31 located on a side of the upper flange portion 22 that is opposite to the terminal portions 12 in an axial direction thereof.

The lower portion 32 is a part that is housed in the lower yoke housing portion 23a of the lower flange portion 23 of the bobbin 2 (see FIG. 3D). The lower portion 32 has a front portion formed in a semi-circular shape and a rear portion formed in a substantially rectangular shape, like the outer shape of the upper portion 31 (see FIG. 5E).

As illustrated in FIG. 5E, the lower portion 32 has recessed portions 32b, 32b formed on portions of the lower portion 32 that face the convex portions 23b, 23b of the lower yoke housing portion 23a (see FIG. 3E). In a state where the lower portion 32 is housed in the lower yoke housing portion 23a, the convex portions 23b, 23b of the lower yoke housing portion 23a are loosely fitted (fitted with a gap) with the recessed portions 32b, 32b of the lower portion 32.

The lower portion 32 is configured so as to be housed in the lower yoke housing portion 23a with a clearance therebetween, and is movable in the horizontal direction with respect to the lower yoke housing portion 23a in a state where the convex portions 23b, 23b are loosely fitted with the recessed portions 32b, 32b as described above. In other words, the convex portions 23b are fitted with the recessed portions 32b in such a way as to allow the above-described movement in the horizontal direction.

The yoke 3 has a circular insertion hole 31a formed in the upper portion 31 as a yoke-side mounting hole and has a circular insertion hole 32a formed in the lower portion 32. These insertion holes 31a, 32a have substantially the same inside diameter D2 as illustrated in FIG. 3D and FIG. 5D. The inside diameter D2 is selected such that the insertion holes 31a, 32a fit over the solenoid valve V1 (V2). Here, the relation between the above-mentioned inside diameter D1 of the insertion hole 21a of the bobbin 2 and the inside diameter D2 of the insertion holes 31a, 32a of the yoke 3 is such that the inside diameter D1 of the bobbin 2 is larger than the inside diameter D2 of the yoke 3, i.e., D1>D2.

(Configuration of Press-Fit Terminal)

Figure 2B:
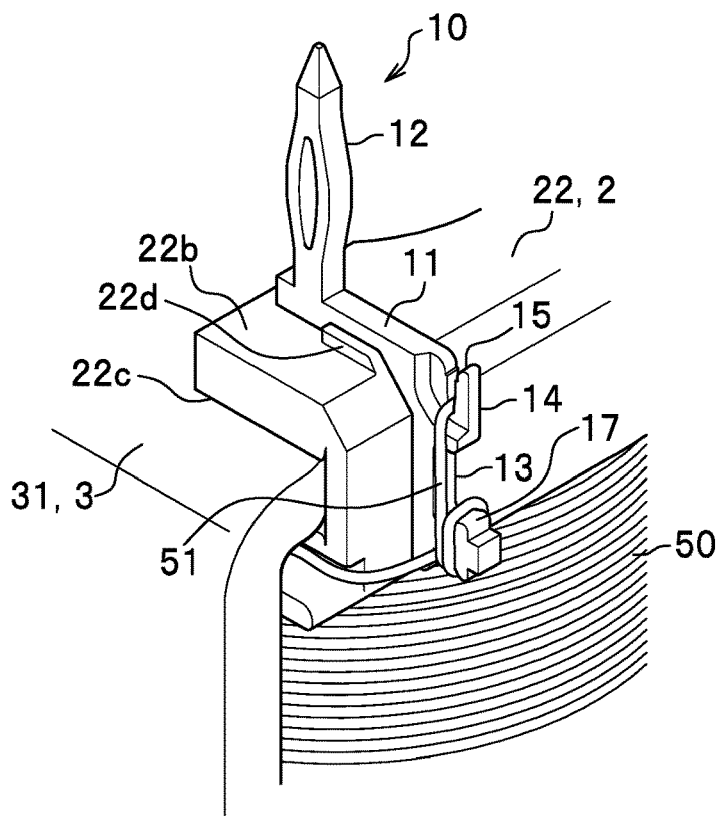

As illustrated in FIG. 2B, the two press-fit terminals 10, 10 are metal components partially insert-molded in the terminal support portions 22b, 22b (the bobbin 2). As illustrated in FIG. 2A, the two press-fit terminals 10, 10 are spaced apart from each other by a predetermined distance in the left-and-right direction.

As illustrated in the views in FIG. 6A to 6D, each press-fit terminal 10 includes a plate-like base portion 11, a terminal portion 12 that protrudes upward from an upper portion of one end of the base portion 11, and a connection portion 13 that protrudes downward from a lower portion of the other end of the base portion 11.

Figure 6A:
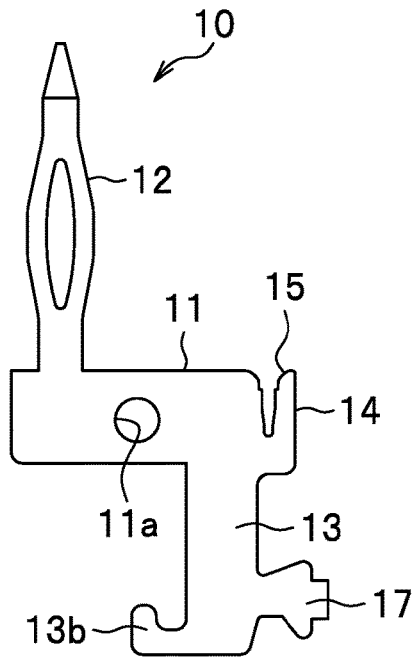
Figure 6B:
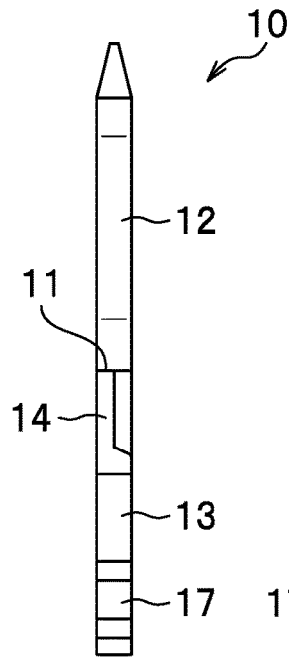

As illustrated in FIG. 2B, the most part of the base portion 11 is embedded in the terminal support portion 22b. The upper portion of the base portion 11 is exposed from the terminal support portion 22b. As illustrated in FIG. 6A, the base portion 11 has an insertion hole 11a formed therein into which resin can enter when being molding. As illustrated in FIG. 2B, the base portion 11 is reinforced and supported by a reinforcing rib 22d provided on the terminal support portion 22b.

As illustrated in FIG. 2B, the terminal portion 12 projects upward (toward the outside in the axial direction of the bobbin 2) from the upper portion of the one end of the base portion 11 and perpendicularly thereto. In other words, the terminal portion 12 extends upward from the upper flange portion 22. The terminal portion 12 has a distal end portion with a loop-shaped bulge, which is press-fitted into a mounting hole 205 (see FIG. 1) of the control board 201 (see FIG. 1).

The connection portion 13 is connected to the winding 51 of the coil 50. The connection portion 13 has a contact portion 14 with which the winding 51 comes into contact and which has a smaller plate thickness than other portion of the connection portion 13. In other words, the press-fit terminal 10, the plate thickness of which is likely to be limited due to the requirement for being press-fitted, is configured such that the connection portion 13 to which the winding 51 is connected is thin-walled to scrape off the coating of the winding 51 by the contact.

Figure 6C:
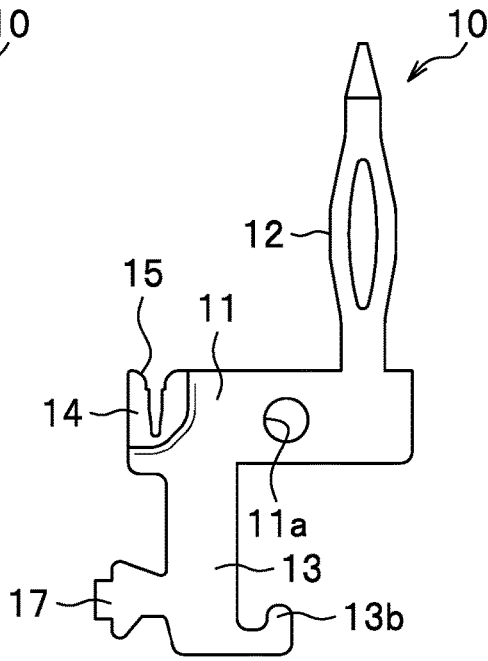
Figure 6D:
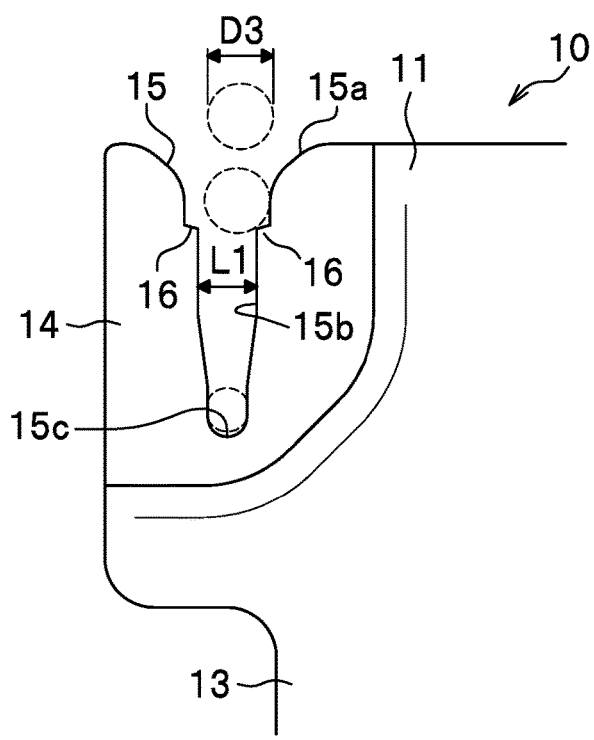

As illustrated in FIG. 6D, the contact portion 14 has a groove 15 formed therein having a substantially V-shaped cross section. The groove 15 has upper edge portions each extending in a rounded shape. The groove 15 has a pair of step portions 16, 16 protruding inwardly (toward an inner side) of the groove 15, at opposed portions of inner surfaces of the groove 15. The step portions 16, 16 define a groove 15b therebetween having a narrow width. The groove 15b defined by the step portions 16, 16 of the groove 15 has a width L1 (width in the left-and-right direction) that is smaller than a wire diameter D3 of the winding 51 (wire diameter of the wire with coating). The groove 15 is formed so as to have a narrower width toward a deepest part 15c.

As illustrated in FIGS. 6A and 6C, the connection portion 13 has a protrusion 17 formed on a lower lateral portion of the connection portion 13 to allow winding a wire of the winding 51 between the protrusion 17 and the groove 15. In addition, the connection portion 13 has a hook portion 13b formed on a lower end portion of the connection portion 13 and protruding in a hook shape toward the terminal support portion 22b (see FIG. 2B). The hook portion 13b (not shown) is embedded in the terminal support portion 22b (see FIG. 2B).

Figure 7:
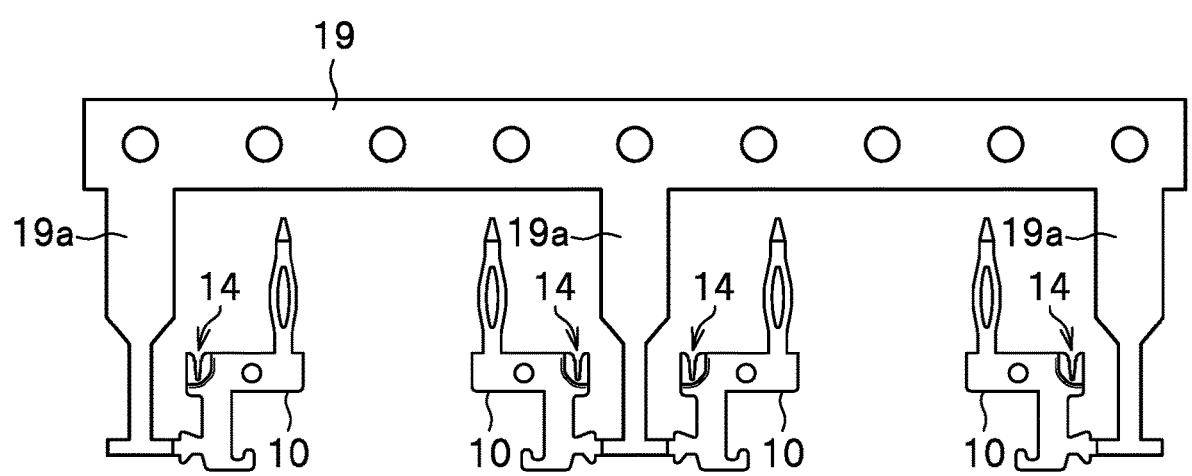
FIG. 7 is a layout view related to the punching of press-fit terminals that are constituent elements of the coil assembly of the embodiment.

The press-fit terminal 10 can be obtained by pressworking (press punching), for example. In the press punching, a flat, belt-like metal plate or the like having conductivity and a predetermined thickness is used to obtain a press punched material including the press-fit terminals 10, as illustrated in FIG. 7. The press punched material includes a frame-shaped connection plate 19 which serves as a carrier and to which press-fit terminals 10 are connected via connection plate connecting parts 19a. Each press-fit terminal 10 is molded according to the above-described terminal structure.

The thin-walled contact portion 14 is formed to have a thin thickness by performing an additional pressworking after the press punching has been performed. Thereafter, the groove 15 is formed by punching.

Note that, the contact portion 14 may be formed by pressworking at the same time as when the press punching is performed, or the contact portion 14 may be formed in advance by pressworking and then the punching-out may be performed.

(Configuration of Coil)

The coil 50 is obtained by winding the wire of the winding 51 around the cylindrical portion 21 of the bobbin 2, as illustrated in FIG. 2A. Two end portions of the winding 51 are respectively attached to the connection portions 13, 13 of the press-fit terminals 10, 10 by being wound therearound, and the coil 50 is electrically connected to each of the press-fit terminals 10, 10.

[Assembling of Coil Assembly]

Figure 8A:
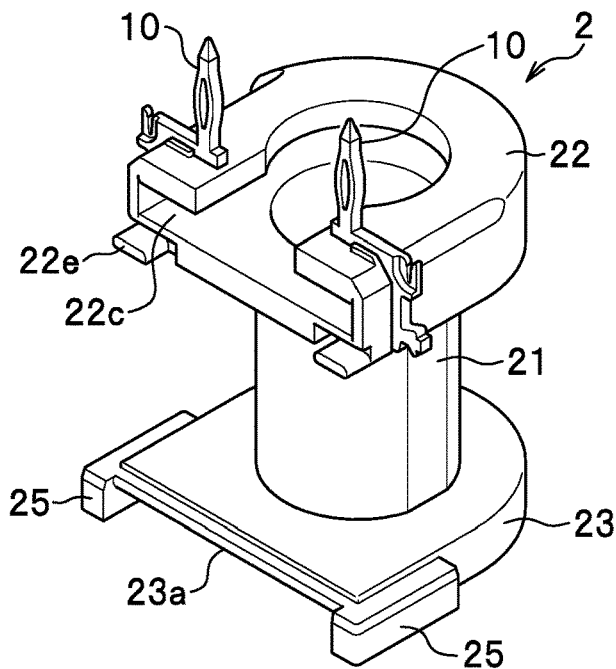
Figure 8B:
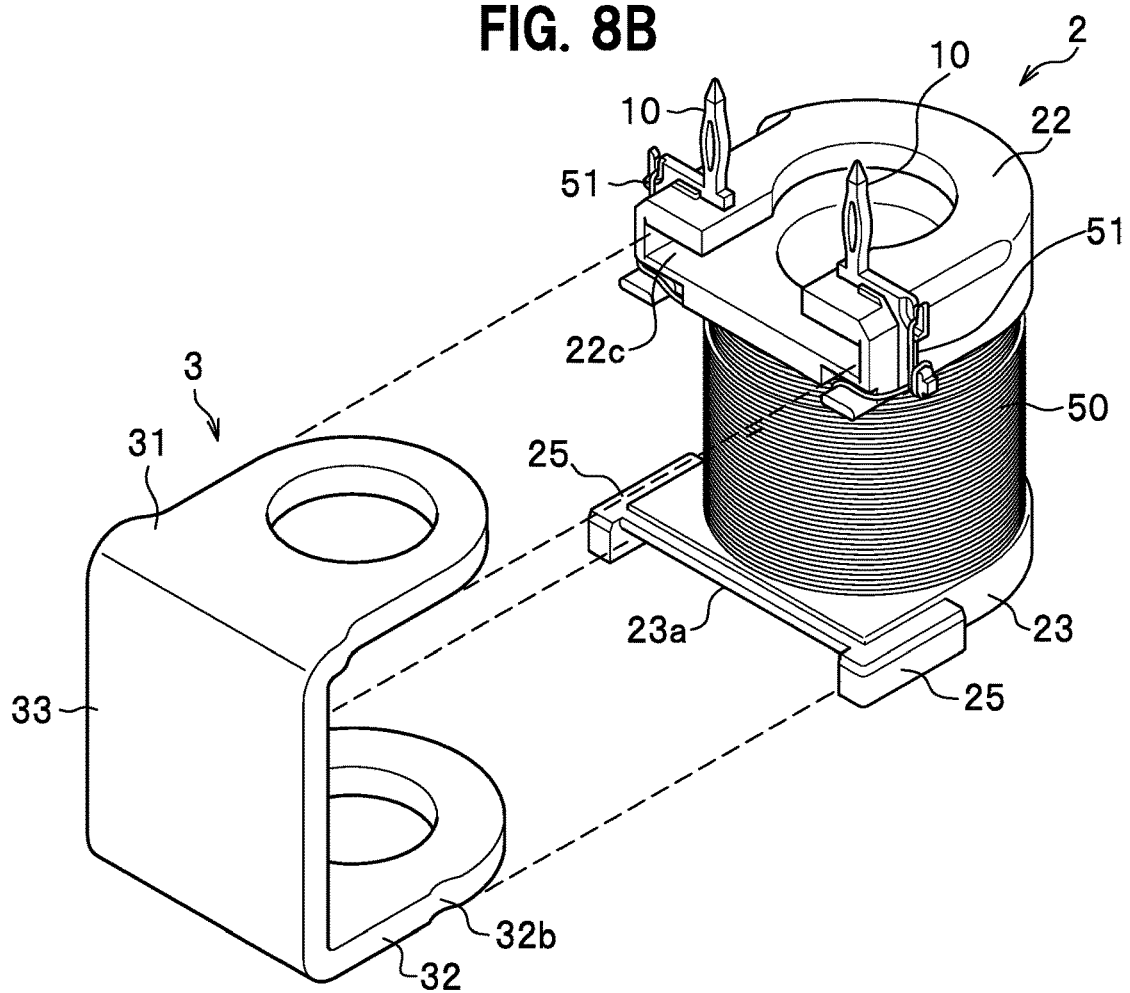

Firstly, as illustrated in FIG. 8A, the winding 51 is wound around the cylindrical portion 21 of the bobbin 2 to form the coil 50 around the bobbin 2, as illustrated in FIG. 8B.

Thereafter, the end portions of the winding 51 of the coil 50 are wound around the connection portions 13, 13 of the press-fit terminals 10, 10 to connect the winding 51 to the connection portions 13, 13, respectively. In this operation, as illustrated in FIG. 6D, when the wire of the winding 51 is inserted into the groove 15 formed in the contact portion 14, the winding 51 comes into contact with the inner surface of the groove 15 to scrape off the coating of the winding 51. In other words, in the course of winding the wire of the winding 51 around the groove 15, the coating of the winding 51 is automatically scraped off by the thin-walled contact portion 14 and the winding 51 is electrically connected to the connection portion 13.

At this time, when the wire of the winding 51 comes into contact with the step portion 16 of the groove 15, the scraping-off of the coating of the winding 51 is facilitated, and the electrical connection of the winding 51 is reliably established. Moreover, as the width L1 (width in the left- and-right direction) of the groove 15b defined by the step portions 16, 16 of the groove 15 is smaller than the wire diameter D3 (wire diameter of the wire with coating) of the winding 51, the coating of the wire of the winding 51 is scrapped off more suitably by inserting the wire of the winding 51 into the deepest part 15c in the winding operation.

Thereafter, as illustrated in FIG. 8B, the yoke 3 is mounted into the bobbin 2. In this operation, the upper portion 31 of the yoke 3 is inserted into the upper yoke housing portion 22c of the bobbin 2, and the lower portion 32 of the yoke 3 is inserted into the lower yoke housing portion 23a. When the lower portion 32 of the yoke 3 is housed in the lower yoke housing portion 23a, the convex portions 23b, 23b (see FIG. 4E) of the lower yoke housing portion 23a are loosely fitted with the recessed portions 32b, 32b of the lower portion 32. This fitting causes the bobbin 2 to hold the yoke 3 and prevents the yoke 3 from falling off from the bobbin 2.

Note that, when the yoke 3 is inserted in the mounting direction more than necessary, the side portion 33 of the yoke 3 abuts on the protrusions 22e, 22e provided on the upper flange portion 22 of the bobbin 2. This prevents the yoke 3 from coming into contact with the coil 50.

In this way, the assembling of the coil assembly 1 is completed.

[Assembling Coil Assembly to Brake Control Device]

According to the embodiment of the brake control device U, as illustrated in FIG. 1, the terminal portions 12 of the press-fit terminals 10 of the coil assemblies 1 disposed in the housing 202 are press-fitted into the mounting holes 205 of the control board 201. In this manner, the coil assemblies 1 are electrically connected to the control board 201 by press-fitting the press-fit terminals 10 in the control board 201.

When attaching the coil assembly 1 to the brake control device U, firstly, the coil assemblies 1 are mounted on the solenoid valves V1 and V2 having been attached to the base body 100. In this operation, if not-shown positioning members such as ribs are provided on the surface 101 on the front side of the base body 100, the protrusions 25, 25 of the bobbin 2 of the coil assembly 1 are locked with the positioning members. This positions the coil assembly 1 so as to be unable to turn around the axis of the bobbin 2. Accordingly, the press-fit terminals 10 are disposed at predetermined positions of the base body 100.

Thereafter, the housing 202 is attached to the base body 100. Subsequently, the control board 201 is brought closer to the housing 202, the press-fit terminals 10 are placed into mounting holes 205 of the control board 201, and the control board 201 is pressed toward the base body 100.

Figure 9:
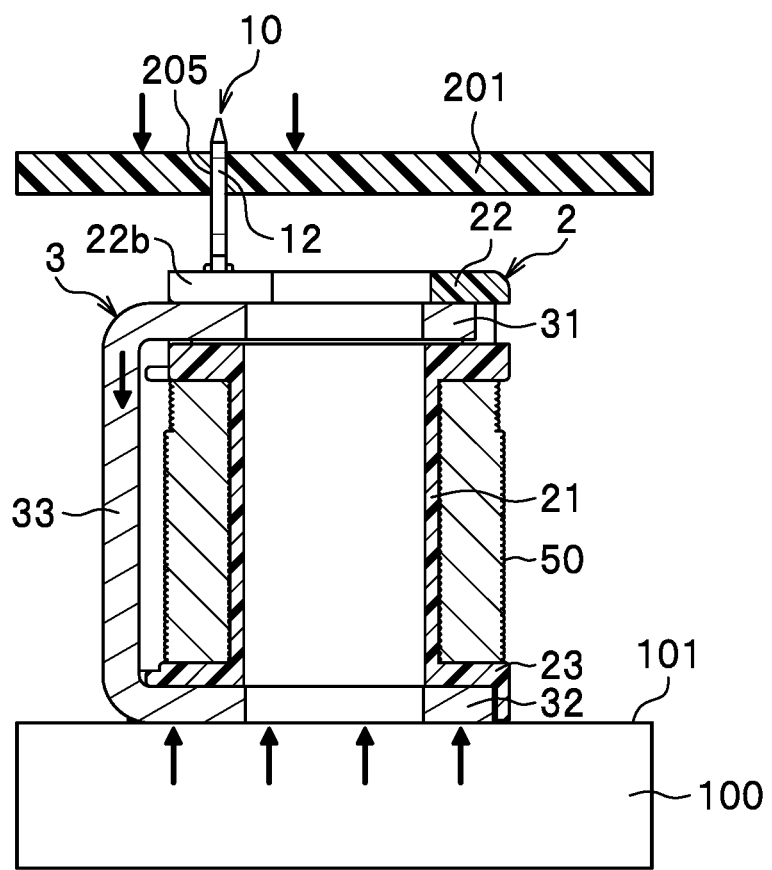
FIG. 9 is an explanatory diagram illustrating a situation how the press-fit terminal is press-fitted into the control board.

In this situation, as illustrated in FIG. 9, the yoke 3 (upper portion 31) supports the press-fit terminals 10, at a location spaced apart from the terminal portions 12 in the axial direction of the terminal portions 12. Specifically, the upper portion 31 of the yoke 3 is arranged in such a way that a flat surface of the upper portion 31 is spaced apart from the terminal portions 12 in the axial direction of the terminal portions 12 and that the flat surface is orthogonal to the axial direction. Thus, the load applied in the axial direction when the terminal portion 12 is press-fitted into the mounting hole 205 of the control board 201 is received by the flat surface of the yoke 3 (upper portion 31) in a direction perpendicular to the flat surface.

The lower portion 32 of the yoke 3 is abutted on the surface 101 of the front side of the base body 100. This enables the base body 100 (product) to receive the load that is applied in the axial direction when the terminal portion 12 is press-fitted into the mounting hole 205 of the control board 201.

The inside diameter D1 of the insertion hole 21a of the bobbin 2 is larger than the inside diameter D2 of the insertion holes 31a, 32a of the yoke 3. This allows, when placing the press-fit terminals 10 into mounting holes 205 of the control board 201, sliding of the bobbin 2 in a direction orthogonal to the axial direction of the solenoid valves V1 and V2 relative to the yoke 3 attached to the solenoid valves V1 and V2. Accordingly, the positioning of the press-fit terminals 10 with respect to the mounting holes 205 of the control board 201 is easy.

After the positioning has been completed, the control board 201 is pressed toward the base body 100, so that the terminal portions 12 are press-fitted into the mounting holes 205 of the control board 201. This electrically connects the coil assembly 1 to the control board 201 via the press-fit terminals 10.

According to the above-described structure of the coil assembly 1 of the embodiment, the yoke 3 supports the press-fit terminals 10, at a location spaced apart from the terminal portions 12 in the axial direction of the terminal portions 12. Thus, the yoke 3 can receive the load that is applied in the axial direction when the terminal portions 12 are press-fitted into the mounting holes 205 of the control board 201. This enables the coil assembly 1 to be electrically connected to the control board 201 without using a tool for assembly or the like. Therefore, it is possible to eliminate a space for placing a tool that was necessary for connection and to enhance the downsizing and the flexibility of layout accordingly.

The yoke 3 supports the press-fit terminals 10 via the bobbin 2 (upper flange portion 22) serving as an insulator. Therefore, it is possible to suitably insulate the yoke 3 from the press-fit terminals 10. Note that, the bobbin 2 is entirely made of resin, and thus insulation is easily achieved.

As the terminal support portions 22b, 22b (resin portions) of the bobbin 2 cover portions of the yoke 3 that support the press-fit terminals 10 (portions of the upper portion 31 that support the press-fit terminals 10), it is possible to suitably insulate the yoke 3 from the press-fit terminals 10.

According to the structure of the brake control device U of the embodiment, when fixing the housing 202 to the one surface of the base body 100, it is possible to press-fit the press-fit terminals 10 by sandwiching the coil assembly 1 with the base body 100 and the control board 201 in the axial direction of the bobbin 2. In other words, the press-fit terminals 10 are supported by the yoke 3 located on a side of the bobbin 2 that is opposite to the terminal portions 12 in the axial direction of the terminal portions 12. Moreover, the yoke 3 is supported by the base body 100 located spaced apart from the terminal portions 12 in the axial direction of the terminal portions 12 than the side of the bobbin 2. This enables the base body 100 to receive the load applied when the terminal portions 12 of the press-fit terminals 10 are press-fitted into the mounting holes 205 of the control board 201. This enables the coil assembly 1 to be electrically connected to the control board 201 without using a tool for assembly or the like. Therefore, the brake control device U having an excellent assembling property can be obtained.

The present invention has been described in the foregoing on the basis of the embodiment. However, the present invention is not limited to the configuration of the embodiment described. The configuration can be changed as appropriate in a range without departing the scope of the present invention. Moreover, a part of the configuration of the embodiment can be added, removed, and replaced.

For example, although the bobbin 2 is described as being entirely formed of a resin, the embodiment is not limited thereto. At least portions that support the press-fit terminals 10 maybe formed of a resin to cause this resin portion to function as an insulator.

Moreover, the terminal portion 12 of each press-fit terminal 10 only needs to protrude upward from the bobbin 2, and the connection portion 13 and the like of the press-fit terminal 10 may be disposed on a lateral side and the like of the bobbin 2.

Moreover, although the press-fit terminals 10 have been described as being insert-molded in the bobbin 2, the press-fit terminals 10 are not limited thereto and may be adapted to be attached to the bobbin 2 later.

Moreover, the press-fit terminals 10 may be configured to be attached to the bobbin 2 via insulators separated from the bobbin 2. In this case, the separate insulators may be configured to cover portions of the yoke 3 that support the press-fit terminals 10.

REFERENCE SIGNS LIST 1 coil assembly
2 bobbin
3 yoke
10 press-fit terminal (connection terminal)
12 terminal portion
13 connection portion
14 contact portion
15 groove
16 step portion
21a insertion hole
31a, 32a insertion hole
22 upper flange portion (insulator, resin portion)
23 lower flange portion
31 upper portion (end portion)
32 lower portion (end portion)
33 side portion
50 coil
51 winding
100 base body
201 control board
205 mounting hole
202 housing
L1 width of groove (deepest portion)
D1 inside diameter of insertion hole on bobbin side
D2 inside diameter of insertion hole on yoke side
D3 wire diameter of winding
V1, V2 solenoid valve (mounted body)
U brake control device

The invention claimed is:
1. A coil assembly comprising:
a bobbin having an axial direction with an upper flange portion at an upper end of the bobbin in the axial direction;
a coil including a winding around the bobbin;
a yoke attached to the bobbin; and
a connection terminal electrically connected to the winding,
wherein the connection terminal is a press-fit terminal that includes a terminal portion projecting perpendicularly from the bobbin outward in an axial direction of the bobbin, wherein the upper flange portion of the bobbin has a terminal support portion formed thereon that supports a base portion of the terminal portion the upper flange portion of the bobbin further includes a yoke housing portion into which an upper portion of the yoke is housed between a first side of the upper flange portion and a second side of the upper flange portion with the terminal support portion formed on the second side of the upper flange portion such that the yoke supports the press-fit terminal by way of a stacked arrangement in the axial direction of the bobbin in which the base portion of the terminal portion is disposed against the second side of the upper flange portion, which is disposed against the upper portion of the yoke.

2. The coil assembly according to claim 1, wherein the yoke supports the press-fit terminal via an insulator.

3. The coil assembly according to claim 2, wherein the bobbin includes a resin portion formed of a resin, and the insulator is the resin portion.

4. The coil assembly according to claim 3, wherein the resin portion covers a portion of the yoke that supports the press-fit terminal.

5. A brake control device that includes the coil assembly according to claim 1, the brake control device comprising:
   a base body in which a fluid path is formed;
   a solenoid valve which is attached to one surface of the base body and on which the coil assembly is mounted;
   a housing fixed to the one surface of the base body, the housing covering the solenoid valve and the coil assembly; and
   a control board housed in the housing, the control board controlling an operation of the solenoid valve,
   wherein the terminal portion is press-fitted into a mounting hole formed in the control board.

6. A brake control device that includes the coil assembly according to claim 2, the brake control device comprising:
   a base body in which a fluid path is formed;
   a solenoid valve which is attached to one surface of the base body and on which the coil assembly is mounted;
   a housing fixed to the one surface of the base body, the housing covering the solenoid valve and the coil assembly; and
   a control board housed in the housing, the control board controlling an operation of the solenoid valve,
   wherein the terminal portion is press-fitted into a mounting hole formed in the control board.

7. A brake control device that includes the coil assembly according to claim 3, the brake control device comprising:
   a base body in which a fluid path is formed;
   a solenoid valve which is attached to one surface of the base body and on which the coil assembly is mounted;
   a housing fixed to the one surface of the base body, the housing covering the solenoid valve and the coil assembly; and
   a control board housed in the housing, the control board controlling an operation of the solenoid valve,
   wherein the terminal portion is press-fitted into a mounting hole formed in the control board.

8. A brake control device that includes the coil assembly according to claim 4, the brake control device comprising:
   a base body in which a fluid path is formed;
   a solenoid valve which is attached to one surface of the base body and on which the coil assembly is mounted;
   a housing fixed to the one surface of the base body, the housing covering the solenoid valve and the coil assembly; and
   a control board housed in the housing, the control board controlling an operation of the solenoid valve,
   wherein the terminal portion is press-fitted into a mounting hole formed in the control board.

\* \* \* \* \*